(12) United States Patent
Vaios

(10) Patent No.: US 6,271,752 B1
(45) Date of Patent: Aug. 7, 2001

(54) INTELLIGENT MULTI-ACCESS SYSTEM

(75) Inventor: Christos I. Vaios, Shrewsbury, NJ (US)

(73) Assignee: Lucent Technologies, Inc., NJ (US)

( * ) Notice: Subject to any disclaimer, the term of this patent is extended or adjusted under 35 U.S.C. 154(b) by 0 days.

(21) Appl. No.: 09/165,915

(22) Filed: Oct. 2, 1998

(51) Int. Cl.[7] .............................. G08B 13/00; H04N 7/18
(52) U.S. Cl. ........................ 340/541; 340/539; 340/531; 340/525; 340/825.06; 348/155; 348/169
(58) Field of Search ...................................... 340/541, 531, 340/505, 825.06, 825.07, 539, 525; 379/37, 38; 348/143, 152, 153, 155, 169; 370/901, 913

(56) References Cited

U.S. PATENT DOCUMENTS

| | | | |
|---|---|---|---|
| 5,111,291 | * 5/1992 | Erickson et al. | 358/108 |
| 5,619,183 | * 4/1997 | Ziegra et al. | 340/505 |
| 5,717,379 | * 2/1998 | Peters | 340/539 |
| 5,761,280 | * 6/1998 | Noonen et al. | 379/3.27 |
| 5,812,054 | * 9/1998 | Cohen | 340/506 |
| 5,815,080 | * 9/1998 | Taguchi | 340/635 |
| 5,838,252 | * 11/1998 | Kikinis | 340/825.44 |
| 5,838,682 | * 11/1998 | Dekelbaum et al. | 370/401 |
| 5,861,804 | * 1/1999 | Fansa et al. | 340/539 |
| 5,892,442 | * 4/1999 | Ozery | 340/539 |
| 5,917,405 | * 6/1999 | Joao | 340/425.5 |
| 5,987,519 | * 11/1999 | Peifer et al. | 709/230 |

* cited by examiner

Primary Examiner—Donnie L. Crosland

(57) ABSTRACT

A multi-access remote system having a security surveillance area, a plurality of end user locations, and a communications network such that one or more of the end user locations can establish a connection with the security surveillance area, and vice versa, using a communications protocol via the communications network. The security surveillance area is comprised of a local computer system, a camera with motion sensor, and a network interface. When the motion sensor detects an obstruction the camera starts recording and the local computer system notifies a remote individual of the alarm via a communications device, such as a beeper, telephone, or e-mail. Using an end user location, having a remote computer system, a network interface, and one or more communications devices, the remote individual can logon to the local computer system via the communications network and obtain additional information, control the video camera remotely, or view video images. Access to the security surveillance area, control of the video camera, and viewing of the video data is accomplished advantageously over the Internet with application specific browser software, plugins, APIs, and other protocols.

39 Claims, 4 Drawing Sheets

INTELLIGENT MULTI-ACCESS SYSTEM

FIELD OF THE INVENTION

This invention relates to remotely accessible monitoring devices, and more particularly, to an intelligent multi-access remote system.

BACKGROUND OF THE INVENTION

Over the past few decades computers and communications technology has evolved into a complex infrastructure where countless different systems, platforms, and other products are now interoperable. Only recently has the concept of open systems become a reality, permitting new developments in standard-based file transfer, electronic mail, and remote log in. Opportunistically, society is becoming increasingly dependent on many of the new technologies made available via phone communications, private computer networks, and the Internet.

One example of how such technology has recently spurred growth in a particular field, is video surveillance. Nowadays, the expense and associated complications with monitoring a particular location has been greatly reduced with the advent of video surveillance. Businesses can now successfully monitor an entire building using only one security guard, who tracks multiple cameras positioned at key locations throughout a selected building. Indeed, one security guard can even monitor multiple buildings, from a remote location, using networking and other available technologies. Occasionally, video recording devices and electronic sensors may be installed to eliminate the need for any security guard. An alarm system can trigger when an electronic sensor detects an intruder and the video recording device can record images that are later supplied to the police for subsequent apprehension of the intruder.

Despite the success of the above and other similar alarm systems, most businesses desire at least one security guard to secure properly the environment. Even the best sensors may accidentally trigger a false alarm, whether by stray animals or faulty wiring. Additionally, police often do not respond as speedily unless a person specifically phones for a response. As a result sophisticated commercial security surveillance systems today incorporate many of the above features with a live person, stationed at a remote central station, available to assume control at the opportune time.

The above surveillance system, however, is not appropriate or feasible for individuals or small businesses. Individuals and small businesses desire the lower cost of having an employee available to respond to an occasional alarm, rather than a full time security guard, but cannot implement an affordable technology that would make this type of system functional. For example, in order to view a smooth high quality stream of video from a remote location, expensive cables need to be installed between the surveillance area and the remote location. Furthermore, small businesses and individuals constantly change locations and even if proper cabling can be installed they may desire a surveillance system that is accessible from any location, not only those that have cabling.

Thus, there is a need for an inexpensive multi-access remote system that enables individuals to access remotely a security surveillance or other video system area and appropriately monitor and operate this area as desired. In addition, there is a need to contact the system users at specific times, such as when an alarm triggers, to provide surveillance access when needed, rather than monitoring the area full time.

SUMMARY OF THE INVENTION

In accordance with one aspect of the present invention, a multi-access remote system is provided and which comprises a security surveillance area, a plurality of end user locations, and a communications network such that one or more of the end user locations can establish a connection with the security surveillance area, and vice versa, using a communications protocol via the communications network.

The security surveillance area comprises a local computer system, a network interface, and a camera having a motion sensor. The local computer system is electronically connected via a camera adapter to the video camera so that video, sound, and motion sensor data can be transmitted from the camera to the local computer system, and instructions or other data can be transmitted from the local computer system to the camera. The local computer system is additionally connected to a computer network interface, which may be a modem, network card, or other communications hardware, used to connect to the communications network. The local computer system includes various components, including an audio/video coder/decoder, fixed storage means, operating system software, communications software, compression software, and application programming interface (API) software.

The end user locations each comprise a remote computer system connected to a network interface, and one or more optional communications devices, such as a telephone, beeper, fax, e-mail, or wireless device for being contacted by the security surveillance area when an alarm triggers. The remote computer system includes operating system software, communications software, compression software, application software, and browser software.

The local computer system first captures a predetermined length of video, compresses the file, and transmits it to the remote user who subsequently plays the downloaded image in high-quality. This method avoids video stream difficulties associated with bandwidth limitations because the entire image is downloaded to the remote computer before viewing.

The browser and application software of the remote computer system may be configured to communicate with the local computer system via the Internet or any other communications network. In one embodiment, the browser contains a video display for viewing video images, and control mechanisms for operating the camera and manipulating the video images, including, focus, rotation, view, peak, dimming, play, record, fast forward, etc.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views.

DETAILED DESCRIPTION OF THE INVENTION

Figure 1:
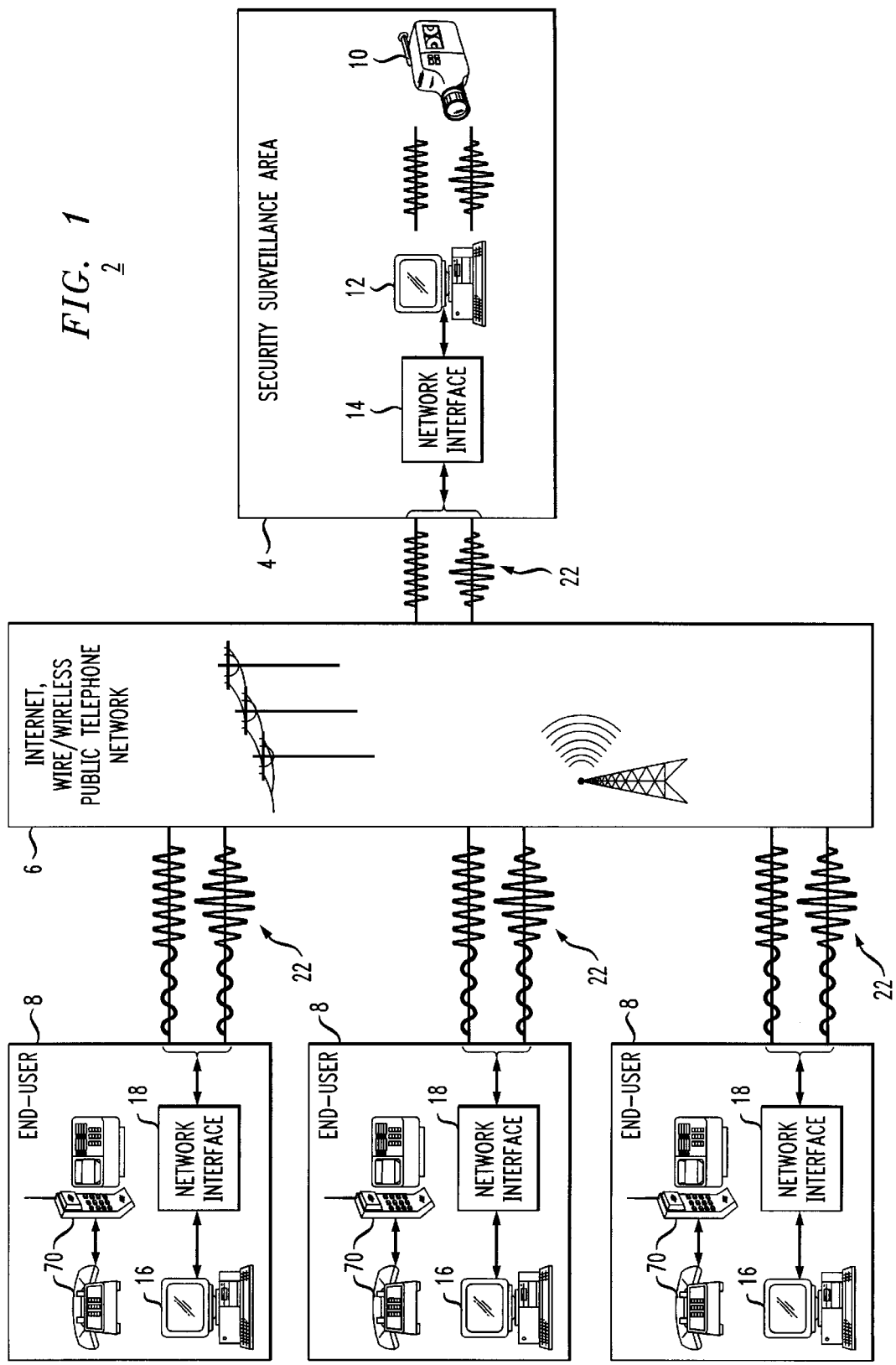
FIG. 1 illustrates the end-to-end architecture of the multi-access remote system according to one embodiment of the present invention.

With initial reference to FIG. 1, the end-to-end architecture of a multi-access remote system 2 is shown, according to one embodiment of the present invention, configured as an intelligent multi-access remote security platform. Multi-access system 2 comprises a security surveillance area 4, a plurality of end-user locations 8, and a communications network 6, such that one or more of the end user locations can establish a connection 22 with security surveillance area 4, and vice versa, using a communications protocol 100 (FIG. 2) via communications network 6.

Security surveillance area 4 comprises a local computer system 12, such as a workstation or server coupled to a network interface 14, and to a video camera 10 having a motion sensor. Local computer system 12 is coupled via a camera adapter 116 (FIG. 2) to video camera 10 so that video, sound, and motion sensor data can be transmitted from the camera to the local computer system, and instructions or other data can be transmitted from the local computer system to the video camera. Local computer system 12 is also coupled to network interface 14, so as to facilitate the use of communications network 6 in order to establish connection 22 and communicate with one or more end user locations 8.

Figure 2:
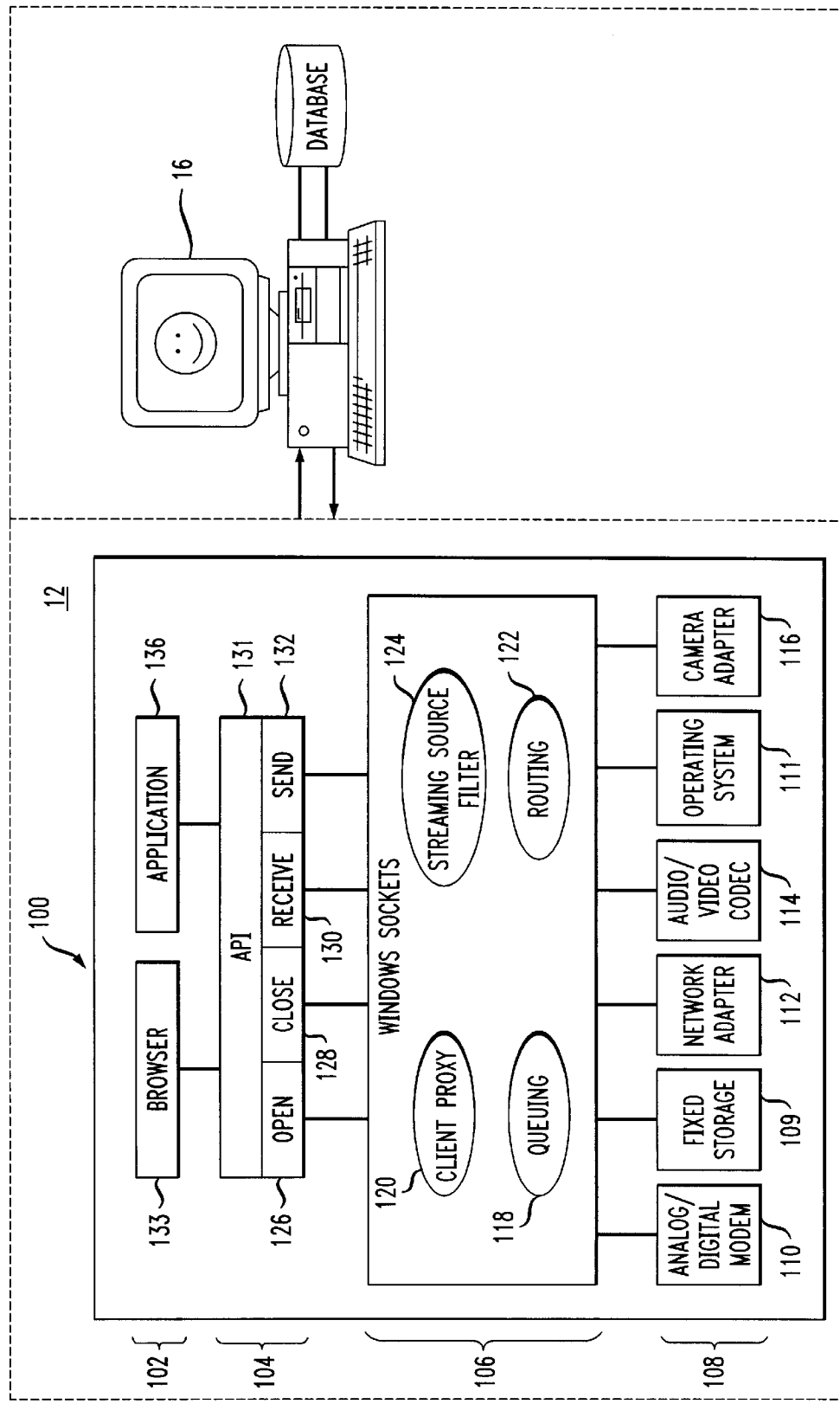
FIG. 2 is a block diagram which illustrates a four-layer communications protocol is employed by servers located at a surveillance area or end-user location according to one embodiment of the present invention.

With reference to FIG. 2, local computer system 12 includes various components, among them, in pertinent part, are fixed storage means 109, and operating system software 111 to provide basic resource allocation and computational mechanisms.

In accordance with one embodiment of the invention, local computer system 12 also includes various components for performing communications between the local computer system and the end-user locations, including an analog/digital modem 110, network adapter 112, and an audio/video coder/decoder, which is configured to provide data compression to compress data according to a variety of compression formats, such as MPEG or PKZIP, prior to transmission.

In one embodiment, the local computer system is configured to operate with the Windows operating system, and preferably utilizes Windows sockets (Winsock) software for virtual communicative abilities. These sockets include a queuing socket 118, a proxing socket 120, a routing socket 122, and an information streaming socket 124.

An application programming interface (API) module 131 is configured to operate as a standard interface language for simpler integration with the end user locations. For example, various API interface components relate to video operation commands 126–132, such as open video stream operation command 126, close video stream operation command 128, receive data operation command 130, and send data operation command 132.

The local computer system further comprises application software 136 to handle customized tasks unique to each embodiment of the multi-access system, and browser software 138 for display control and management. Winsock components 118–124, API components 126–132, application software 136, and browser software 138 are described in more detail below.

End user locations 8 each comprise a remote computer system 16, a network interface 18, and one or more optional communicative devices 20. For example, as will be described below, a telephone, beeper, fax, e-mail, or wireless device may be added to an end user location as a communicative device for contacting or being contacted by the security surveillance area. Furthermore, as with the security surveillance area, the remote computer system of each end user location is coupled to a corresponding network interface.

Remote computer systems 16 of end user locations 8 each advantageously comprise the same software and hardware components as the local computer system. More specifically, this includes the components shown in FIG. 2, including browser software 138, application software 136, API software 131, and Windows sockets software 106. Thus, in one embodiment of the present invention, the remote computer systems can also be employed as a surveillance area. Further, it is noted that any component, as, for example, those shown in FIG. 2, can be solely situated at either the local computer system or the remote computer systems without losing functionality. It is commonly understood to those skilled in the art that various components, including those listed above, can function properly despite being situated at remote locations.

Communications network 6 comprises a physical communications linking means, necessary in order to establish connection 22 so that the security surveillance area can communicate and transfer information with the end user locations, and vice versa. The linking means, in one embodiment, can simply be a public telephone network for providing a private phone connection between the security surveillance area and an end user location. In alternative embodiments the linking means can include the Internet, a local area network (LAN), a wide area network (WAN), a bidirectional cable, a satellite or any other communications or computer structure that enables two remote computer systems to interoperate.

Connection 22 is a temporary or permanent logical connection that allows the security surveillance area and the end user systems to exchange data and communicate though the communications network, and can be established in a number of ways. For example, in one embodiment, the communications network can be a public telephone network, whereby a modem network interface of an end user location can communicate with a compatible modem network interface of the security surveillance area by having one modem dial the appropriate phone number, having the public telephone network find the address of the dialed phone number, having the dialer logically linked with this address, and having the two modems handshake a proper communications language over this link, thus establishing connection 22. In another embodiment, the communications network can be a LAN, whereby a permanent logical connection is always established as long as the LAN is operational and connected to the network interfaces of the security surveillance area and the end user locations. In yet another embodiment, the communications network can include the Internet, whereby connection 22 is established by having the security surveillance area and an end user location logged on or permanently connected to the Internet.

Notably, network interfaces 18 of the end user locations need not be compatible with network interface 14 of the security surveillance area when using an open system communications network such as the Internet, since they can interoperably communicate via accepted protocols that translate the two forms of data. One such protocol used on the Internet is External Data Representation (XDR), which is a TCP/IP protocol used to reconcile differences in data syntax between platforms. It is appreciated by those skilled in the art that two or more remote computer systems can establish a connection and communicate with each other in the above and other manners. It is additionally understood that this invention may utilize various operating system platforms, such as OS/2, DOS, and Windows NT, and various network interfaces, such as cable modems, network cards, T1 links, and satellite connections.

In one embodiment, network interface 14 may be a network card, whereas the local computer system signals another computer system on a computer network to request available resources, which in turn uses communications means to access the end user locations via the communications network.

Thus, according to one embodiment of the present invention, various components of local computer system 12 define a four-layer system 102–108 that collectively form the relevant communication software and hardware structure of multi-access system 2. Within a typical system of layers, as here, each layer, by definition, embodies a set of protocols or services that all process similar functions, whereas each layer performs a distinct service in relation to all other layers. As shown in FIG. 2, the four layer system of this embodiment communicatively interconnects security surveillance area 12 with remote computer systems 16 by successively transmitting a communication originating at one location through each of layers 102–108 so that the communication is received at the other location translated and in a proper format.

Network layer 108 comprises various device drivers and basic components of the corresponding local computer system and is generally responsible for maintaining system functionality and driving various input/output (I/O) devices coupled to the local computer system. In one embodiment of the invention, network layer 108 simply comprises the hardware components that are integrated with the local computer system, such as analog/digital modem 110, network adapter 112, audio/video codec 114, camera adapter 116, fixed storage means 109, and operating system software 111, as explained before. In another embodiment the network layer can comprise only device driver components that communicate with specific hardware, such as the camera adapter.

Winsock layer 106 includes standard network application programming interface (API) functions for queuing socket 118, client proxy socket 120, routing socket 122, and streaming source filter socket 124. Briefly, queuing socket 118 involves scheduling multiple processes that desire simultaneous access to the same resource. For example, if two processes desire to simultaneously control the video camera or have access to the same network adapter, they would be allocated these resources one at a time in order to prevent any conflicts. Proxing socket 120, is a mechanism whereby one system functions for another when responding to protocol requests. For example, an IP communication from an end-user location that is searching for the security surveillance area on a local network may be redirected to a specific computer, which in turn properly identifies the hardware location for quicker delivery. Routing 122 is the intelligent delivery of data to its ultimate location, usually over the shortest or most efficient path. As network performance and responses may be impacted by high traffic imposed by the security surveillance area intelligent delivery of data over the most efficient path is desired. Information streaming 124 offers specific controls, securities, or filtrations for transmitted data. For example, an unauthorized or corrupt data stream can be removed from transmission by a properly configured filter.

Application API layer 104 comprises application specific APIs, for operating and sending specific instructions to security surveillance area 4, such as instruction commands 126–132, as discussed before. APIs are a set of functions or programs that enable computer developers to write networkable or other applications, without the need to understand how the underlying protocols operate. One standard API used in this embodiment of the invention is the Windows socket interface (Winsock), as shown in Winsock layer 106.

Winsock was released by Microsoft in 1993 as an open system technology to provide a library of functions that act as a standardized interface for applications. Microsoft designed Winsock to enable any application that is written to the Winsock API to run with any Windows application, on any machine. Similar to the idea behind TCP/IP and UNIX, Microsoft created this open system to prevent vendor dependencies. Thus, by using Winsock, software can be developed to incorporate certain features in a more efficient manner and on a higher programming level. For example, the software of this invention can use a Winsock compliant TCP/IP protocol stack without knowing how TCP/IP protocol support is provided. Similarly, regarding application API layer 104, various systems can use the supplied functions to more easily interact with the security surveillance area. The development and operation of APIs is well understood to those skilled in the art.

Interface layer 102 comprises high-level end-user software, such as browser and application software. The interface layer, as will be described in more detail below, acts as a display interface for the remote user, which in turn appropriately calls the API functions of API layers 104 and 106 when certain low-level commands are needed.

Illustratively, when operating the multi-access remote system a remote user may activate a desired function from the interface layer, which in turn is executed by the API layers into a networkable or other communicable language, which in turn is received by the network layer and translated and delivered, via a device driver if necessary, to the appropriate local hardware. It should be noted that the software and hardware of layers 102–108 are not fixed to any particular location. For example, interface layer 102 can be stored at remote computer system 16, while API layers 104 and 106 are stored at local computer system 12. Alternatively, all four layers can be stored at the local computer system, if desirable.

Advantageously, the communications network offers a link to the Internet, allowing communication with the surveillance area from nearly any remote location at substantial convenience and reduced cost. The Internet is a collection of networks each connected through gateways, nowadays commonly referred to as routers. Internet gateways operate in the same manner as gateways that connect ordinary networks. They are responsible for routing data around the Internet until they reach their ultimate destination. The actual transfer of information is accomplished through a suite of protocols, such as Transmission Control Protocol/Internet Protocol (TCP/IP), that offer interoperability between computers of all sizes, regardless of the hardware or software platform supporting them. These protocols have achieved popularity primarily due to their classification as an open system, from public availability of its specifications. The underlying protocols of TCP/IP, and the Internet's architecture and usage are commonly known to those skilled in the art.

The Internet Protocol (IP) comprises the heart of TCP/IP by performing the most essential functions, such as data encapsulation, data routing, header formatting, fragmentation and reassembly, and exchanging data across protocol boundaries with other protocols. The header of an IP transmission is sized at approximately five or six 32-bit words and contains valuable address and formatting fields. One such field is the service type field, which allows an application to assign a different service type to each IP transmission, such as maximum throughput for File Transfer Protocol (FTP) and Simple Mail Transfer Protocol (SMTP), and minimum delay for Telnet. The multi-access remote system can utilize the various features of IP transmission for more efficient communications. It is understood as well that the surveillance area and the end user locations must each have an IP address for properly receiving data from a remote location.

One common drawback when using the Internet for large data transmissions, as with the multi-access remote system, is the limited bandwidth available for optimum speed. Currently, the Internet backbone is connected to several thousand sites via T-3 links, which run at 44,736 megabits per second. In order to increase the bandwidth to accommodate the large transmissions of data and the rapidly increasing number of connected users, technologies such as Asynchronous Transfer Mode (ATM) and Synchronous Optical Networks (SONET) are being proposed to increase the Internet bandwidth to 1 to 2 gigabits per second. While the present invention would run more efficiently with technologies such as ATM or means for intelligently allocating bandwidth dynamically, the unique system outlined herein enables high quality data to be efficiently transmitted over minimal Internet bandwidth.

Figure 3:
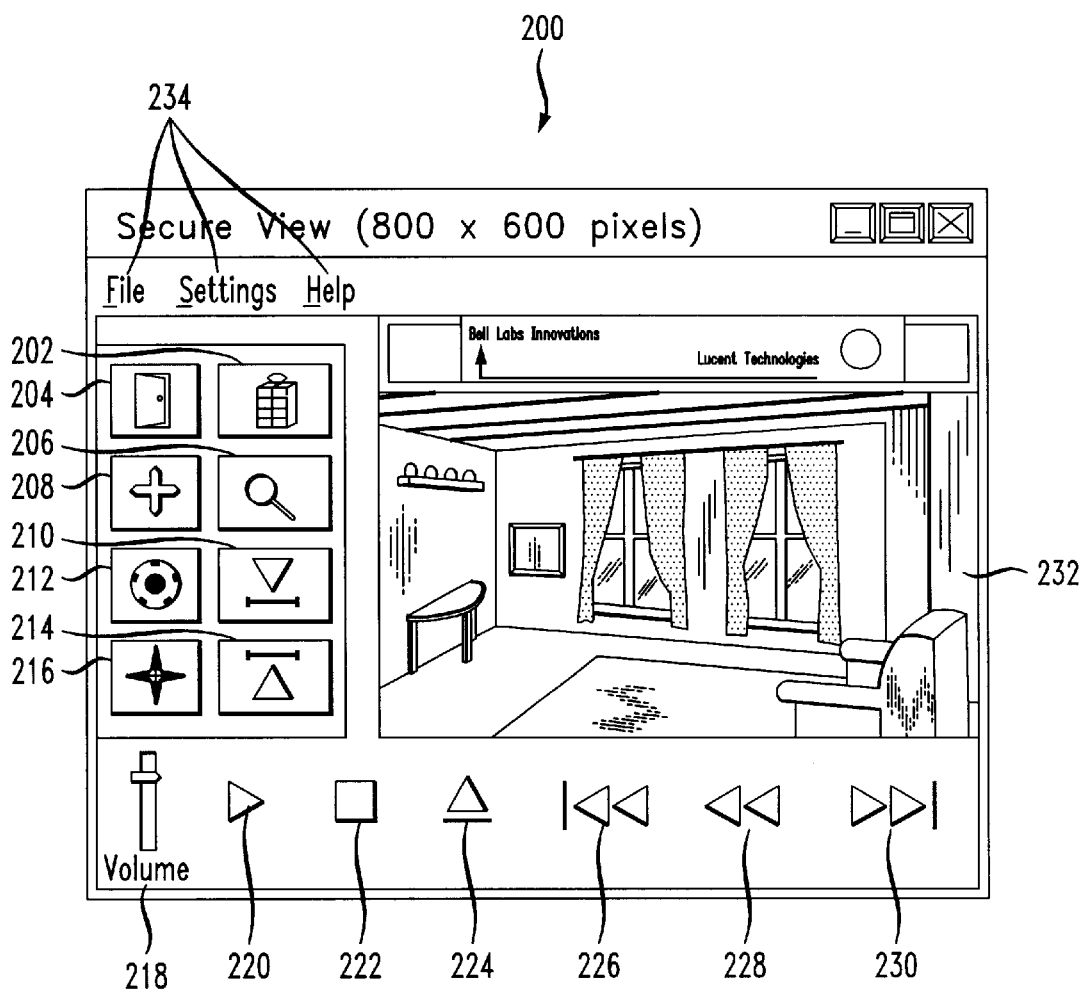
FIG. 3 illustrates a browser application display screen according to one embodiment of the present invention.

A popular user interface used with the Internet is a browser software. As described with the interface layer of FIG. 2, various browser and application software can be integrated with the system of this invention to act as an application program or user interface. According to one embodiment of the present invention, the interface layer may preferably include an application specific Internet browser 200 (FIG. 3) as a controller module for visual interface communication between the end-user locations and the surveillance area. Through the use of plugins, APIs, and hypertext transport protocol (HTTP), browser 200 can incorporate application specific functions such as video display, and remote operation of video camera 10. FIG. 3 shows the display screen of browser 200, as would be seen on an output device, such as a computer monitor, configured according to an application of one embodiment of the invention. Browser 200 is comprised of a standard menu structure 234, control icons 202–230, and a video display area 232.

Video display area 232 is a portion of the browser display screen where all video images and recordings are visibly displayed to the end user. The video display area may utilize plugins or other software to enable the video images to be played or viewed.

In order to manipulate video camera 10, adjust the image quality, or alter what is seen on video display area 232, appropriate control icons 202–230 are selected. Selecting an icon is simply achieved by triggering an input device, such as by clicking a mouse while the cursor pointer has been moved to the appropriate area on browser 200.

With the control icons of this embodiment it is possible to accomplish various tasks. For example, icon 202 is used to select a window view. Icon 204 is employed to select a door view. Icon 206 is used to focus an image. Icon 208 is used to rotate an image. Icon 212 is used to increase or dim image light. Icon 210 is used to peak the camera downwards. Icon 214 is used to peak the camera upwards. Icon 216 is used to rotate the camera. Additional control icons, located on lower portion of browser, include standard video controls, which are volume control icon 218, play icon 220, stop icon 222, record icon 224, rewind icon 226, instant replay icon 228, and fast forward icon 230. It is understood that in accordance with one embodiment, the browser is configured to incorporate the functions of a security surveillance application and may be modified as needed for other embodiments. Additionally, the features available from the control icons can be incorporated into menu structure 234, as is commonly understood in the art.

Illustratively, while connected to the security surveillance area, if an end user desires, for example, to physically lower the video camera, he or she could select the peak camera downwards icon. In one embodiment, the browser from the interface layer of communications protocol 100 responds by calling an appropriate API function from application API layer 104 to translate the peak downward request. Then, if necessary, Winsock layer 106 receives the translated peak request and transports it or performs various network activities, like routing or queuing the peak request until the desired resource is located or available. In this example, the resource desired is the camera adapter or local computer system hardware from the network layer, where the peak request is translated into a hardware signal so that the camera peaks downward. Once the peak request is processed the end user may select another function, like downloading or playing the new video images.

Figure 4:
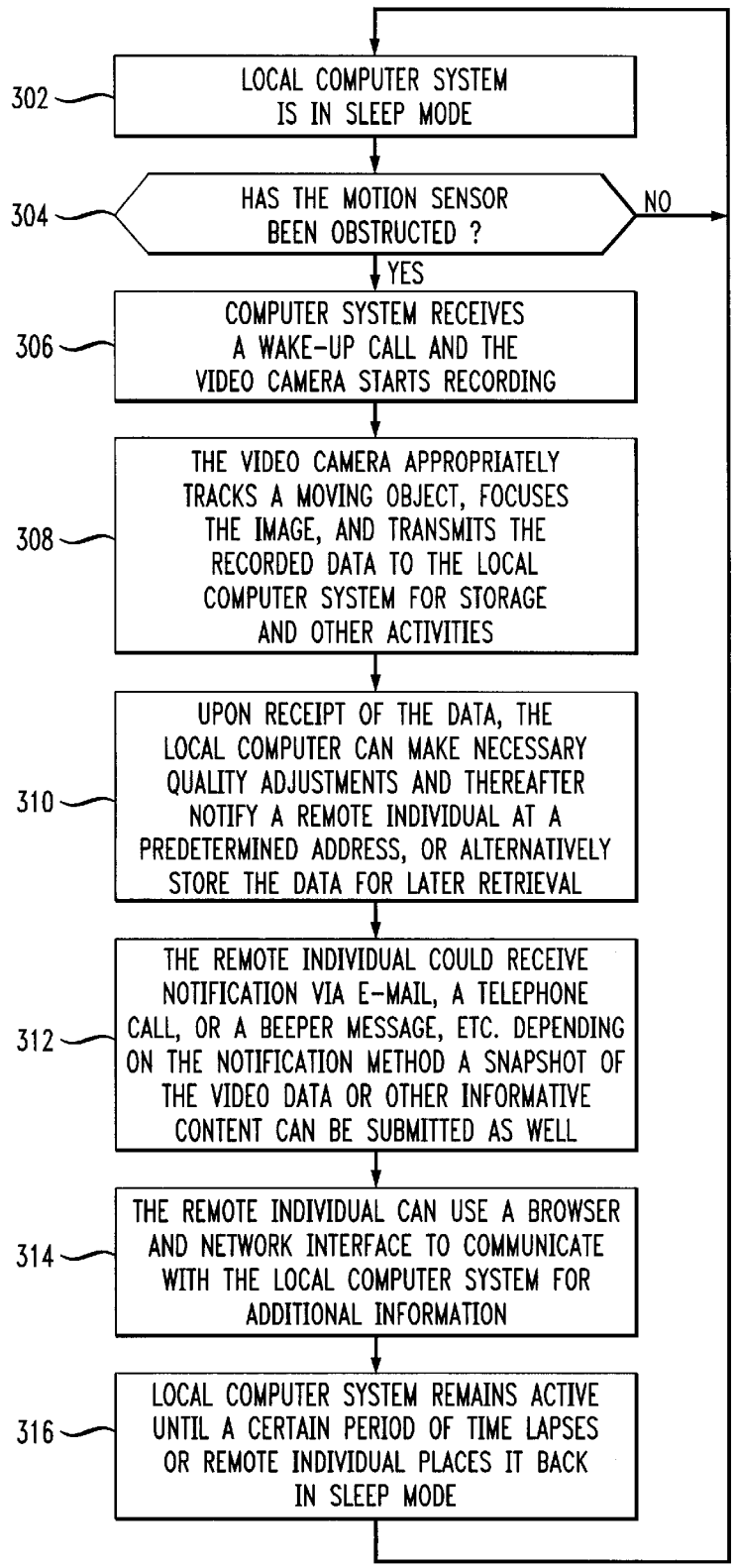
FIG. 4 is a flow diagram which illustrates the sequence of operation of the multi-access remote system according to one embodiment of the present invention.

Operation loop 300, illustrated in FIG. 4, describes the steps employed in operating the multi-access remote system, according to one embodiment of the present invention. By default, local computer system 12 of the security surveillance area remains idle in sleep mode, as shown in step 302, until "awakened" by a motion sensor obstruction in step 304. While in sleep mode the local computer system continuously checks if the motion sensor alarm has been triggered, and once triggered the operation loop jumps to active mode in step 306. Advantageously, the local computer system should be configured so that the time needed to "awaken" and jump to active mode is reduced to a minimum.

The active mode commences in step 306 by awakening the local computer system and turning on the video camera. Thereafter, in step 308, the video camera tracks the obstruction detected by the sensor, focuses the image, and transmits the video data to the local computer system for storage and other data manipulation. Once the local computer receives the video data, necessary quality adjustments are made, as well as notification of the alarm to a remote individual, as shown in step 310. Notably, should the remote individual be out of contact the local computer system can store the video data for later retrieval.

The notification sent by the local computer system is received by the remote individual in step 312. This notification could be a beeper message, a telephone call, or an e-mail message. Advantageously, e-mail or other similar technologies are used in order that a snapshot of video data or other informative content may be attached to the notification. As shown in step 314, the remote individual can use the communications network to establish connection 22 and logon with the surveillance system so that he or she may communicate with the local computer system for additional information. Employing the browser software, as described above, the remote individual can operate the camera and retrieve additional video, sound, or other data via connection 22. The local computer system remains active and the video camera continues to record, as illustrated in step 316, until the remote individual places the system back in sleep mode or a certain predetermined period of time lapses and the system automatically goes into sleep mode.

Since many individuals use a low bandwidth connection to the Internet, which is insufficient for high-quality live video streaming, a different mechanism for data transmission is advantageously utilized. According to one embodiment, the local computer system captures, from the camera, a predetermined length of video, compresses the video using MPEG, or other video compression technologies, and transmits this data file to the remote user, whereby the downloaded video is played in high quality. This method avoids video stream difficulties associated with bandwidth limitations because the entire image is downloaded to the remote computer before viewing. In addition, the user may incorporate live low-quality video streaming with this method, by continuously monitoring the security surveillance area with a low quality video stream and subsequently downloading selected images for high quality viewing.

It is understood that the present invention is not limited to the embodiments as described hereinabove. In an alternative embodiment video camera 10 may be a sophisticated 360 degree camera and the motion sensor can be a more expensive heat sensor or other detection device. There may be multiple cameras or multiple surveillance areas as well, or even alternative monitoring devices that record data other than video, such as sound, heat, pressure, and fingerprints.

Further, yet other embodiments may contain various methods for transmitting video data. As mentioned above, there may be a live data stream, that uses low quality video. Instead, high quality video may be used, but only every fifth frame, for example, is shown, instead of a fully continuous transmission. Data may also be transmitted using commercial software, such as Microsoft Netmeeting, whereas application specific functions and APIs are incorporated to facilitate the features of this invention, such as control over the security surveillance area and more efficient data transmission. Moreover, this system can be implemented according to H.323 or other videoconferencing standards, with the necessary modifications as detailed above.

In alternative embodiments, the multi-access remote system can be configured to function other than as a security surveillance area. For example, a monitoring site can be created to control viewing of plants, animals, a conference room, a baby crib, a house entrance, or a computer terminal. Further, multiple monitoring areas can be incorporated to expand the system into video phone calls, where a person may be called to control a video camera stationed at the called party's location. In addition new forms of touring, class attendance, and other viewing sites are possible, since remotely controllable cameras can be positioned at any location or scenic lookout and remote users can control dynamically which area they wish to view. Understandably, this system, as with any of the above systems, can additionally be secured through password protection to allow access only to certain individuals.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. A multi-access remote system, comprising:
   a monitoring area having at least one monitoring device connected to a corresponding monitoring computer system, said monitoring computer system configured to receive a plurality of independent connections from a plurality of end user locations each having a corresponding end user computer system, wherein said monitoring device automatically tracks a moving object detected in said monitoring area;
   a communications linking means for establishing said independent connections and exchanging data between each one of said end user computer systems and said monitoring computer system;
   a controller module accessible by each one of said end user locations configured to cause transmission of control signals for remotely controlling the operation of said monitoring device;
   a sensor device configured to provided a triggering signal to said monitoring computer system when said moving object is detected in said monitoring area, so that said monitoring device tracks said detected moving object such that said monitoring device follows the location of said moving object; and
   a user interface unit coupled to said controller module for providing visual display to each one of said users, said user interface comprising a plurality of control icons, said control icons configured to activate one or more of a plurality of functions via said controller module.

2. The multi-access remote system of claim 1 configured to operate as an intelligent multi-access remote security platform.

3. The multi-access remote system of claim 1, further comprising a sensor connected to said monitoring device for triggering an alarm at predetermined instances.

4. The multi-access remote system of claim 3, whereas said alarm causes said monitoring computer system to notify a remote individual, so that said remote individual may logon to said monitoring computer system from said end user location.

5. The multi-access remote system of claim 3, wherein said sensor comprises a motion detector and a heat dissipation device.

6. The multi-access remote system of claim 1, wherein said monitoring device is a video camera.

7. The multi-access remote system of claim 1, wherein said end user location comprises a plurality of communicative devices.

8. The multi-access remote system of claim 7, wherein said plurality of communicative devices comprise a computer system, a telephone, a beeper, and e-mail.

9. The multi-access remote system of claim 1, wherein said communications linking means includes the Internet.

10. The multi-access remote system of claim 1, wherein said controller module further comprises a browser software for interfacing said controller module with an end-user at said end-user location, said browser software further providing, said user interface.

11. The multi-access remote system of claim 1, wherein said control icons comprise one or more of a window view icon, a door view icon, a focus image icon, a rotate image icon, a dim light icon, a peak down icon, a peak up icon, a rotate camera icon, a volume icon, a play icon, a stop icon, a record icon, a rewind icon, an instant replay icon and a fast forward icon.

12. The multi-access remote system of claim 1, wherein upon said triggering of said sensor device said monitoring device initiates recording and a remote individual is notified.

13. The multi-access remote system of claim 12, wherein said notified remote individual is provided with a video snapshot from said monitoring device.

14. The multi-access remote system of claim 12, wherein said remote individual is provided with a video recording of said detected moving object.

15. The multi-access remote system of claim 1, wherein said controller module responds to a plurality of said control signals from said end user locations via a queuing socket.

16. The multi-access remote system of claim 1, wherein said sensor device is one of a motion sensor device, a heat sensor device, a light sensor device.

17. A method for operating a multi-access remote system having a monitoring area with one or more monitoring devices connected to a corresponding monitoring computer system, said monitoring computer system configured to receive a plurality of independent connections from one or more end user locations each having a corresponding end user computer system, a communications network, and a controller module accessible by each one of said end user locations, and wherein a sensor is further coupled to said monitoring computer system to detect an obstruction, comprising the steps of:

establishing a plurality of independent connections between one or more of said end user computer systems and said monitoring computer system via said communications network;

transmitting one of more control signals from said end user locations to said monitoring area via said controller module in order to control the operation of said monitoring devices;

triggering an alarm upon activation of said sensor;

automatically tracking the movement of said obstruction so that said monitoring computer system follows the location of said obstruction; and notifying a remote individual via a communications device in response to said alarm so as to make available to said remote individual a view of said obstruction causing said alarm trigger.

18. A method for operating a multi-access remote system via the Internet having a monitoring area with one or more monitoring devices connected to a corresponding monitoring computer system, comprising the steps of:

(a) generating an alarm indication via a communication network, upon detecting a triggering event in said monitoring area;

(b) at least one of said monitoring devices automatically tracking one or more moving objects in response to detection of said triggering event via a sensor device;

(c) providing access to said monitoring devices via the Internet in response to a request from an end user computer system; and (d) responding at said monitoring computer system to one or more Internet protocol signals generated via a user interface accessible by said end user computer system so as to control the operation of said monitoring devices, said user interface configured to provide a visual display and comprises a plurality of control icons, said control icons configured to activate one or more of a plurality of functions.

19. The method in accordance with claim 18, wherein said Internet protocol signals are generated by an application specific browser software.

20. The method in accordance with claim 18 wherein said step of responding further comprises the step of controlling the view of said monitoring area by remotely manipulating said monitoring devices.

21. The method in accordance with claim 20, wherein said Internet protocol signals comprise application programming interface (APIs).

22. The method in accordance with claim 18, wherein said generating step comprises the step of providing an indication signal via a pager system.

23. The method in accordance with claim 18, wherein said generating step comprises the step of providing an indication signal via an e-mail message.

24. The multi-access remote system of claim 18, wherein said visual display comprises one or more control icons for controlling said monitoring computer system via said Internet Protocol signals.

25. A user interface unit coupled to a controller module for providing visual display to plurality of users of a multi-access remote monitoring system, said monitoring system comprising a monitoring device for tracking and recording images, said user interface comprising:

a video portion for displaying video output from said monitoring device, wherein said monitoring device automatically tracks a moving object such that signals relating to said moving object remain within said video output;

a plurality of video camera control icons, said video camera control icons configured to activated one or more of a plurality of video camera functions via said controller module;

a plurality of display control icons for manipulating appearance of said video portion; and a plurality of recording control icons for instructing said controller module to perform at least one of a plurality of video recording functions.

26. The user interface of claim 25, wherein said video camera control icons comprise a window view icon, a door view icon, an image focus icon, a rotate image icon, a dim image icon, a peak camera icon, and a rotate camera icon.

27. The user interface of claim 25, wherein said recording control icons comprise a play icon, a stop icon, a record icon, a rewind icon, an instant replay icon, a fast forward icon, and a volume control icon.

28. A multi-access remote system, comprising:

a plurality of monitoring areas, each area having at least one monitoring device connected to a monitoring computer system, said monitoring computer system configured to receive a plurality of independent connections from a plurality of end user locations each having a corresponding end user computer system, wherein each of said monitoring devices automatically tracks a moving object detected in a corresponding monitoring area;

a communications linking means for establishing said independent connections and exchanging data between each one of said end user computer system and said monitoring computer system;

a controller module accessible by each one of said end user location configured to cause transmission of control signals for remotely controlling the operation of any one of said monitoring devices;

a sensor device configured to provide a triggering signal to said monitoring computer system when said moving object is detected in one of said monitoring areas, so that a corresponding monitoring device automatically tracks said detected moving objects such that said moving object remains within view of said monitoring computer system; and a user interface unit coupled to said controller module for providing visual display to each one of said users, said user interface comprising a plurality of control icons, said control icons configured to activate one or more of a plurality of functions via said controller module.

29. A multiaccess remote control system in accordance with claim 28, wherein said controller module further comprises a queuing module that schedules multiple requests to access any one of said monitoring devices.

30. A multiaccess remote control system in accordance with claim 29 further comprising a network of controller modules each controller module coupled to a plurality of corresponding monitoring devices each of said controller moduled including a proxing module configured to identify and direct a request from any one of said end users to a desired monitoring device.

31. A multiaccess remote control system in accordance with claim 29, wherein said controller module further comprises a storage means for storing compressed audio and video signals received from said monitoring devices containing video representation of movement of said moving objects, so as to transmit said compressed signals to said end users.

32. A multiaccess remote control system in accordance with claim 31 wherein said compressed signals are sent to said users in accordance to a schedule.

33. A multi-access remote system, comprising:

a monitoring area having at least one monitoring device coupled to a communication network, said monitoring device configured to communicate with a plurality of end user locations each having a corresponding end user computer system;

each of said end user computer systems further comprising a controller module for transmitting via said communications network, control signals for remotely controlling the operation of said monitoring device;

at least one of said controller modules further comprising a queuing module that schedules multiple requests to access any one of said monitoring devices; and a user interface unit coupled to said controller module for providing visual display to each one of said users, said user interface comprising a plurality of control icons, said control icons configured to activate one or more of a plurality of functions via said controller module.

34. A multi-access remote system in accordance with claim 33, further comprising a sensor device configured to provide a triggering signal when a moving object is detected in one of said monitoring areas, so that said monitoring device automatically tracks said detected moving objects so as to follow the location of said moving object.

35. A multi-access remote system in accordance with claim 34 further comprising a video storage system coupled to said monitoring device to store video images of said detected moving object for later transmittal to any one of said end user locations.

36. A multi-access remote system in accordance with claim 35 wherein said video images are stored in a compressed format.

37. A multi-access remote system in accordance with claim 36 further comprises a notification means configured to send a notification message to any of said end users after said video images have been stored.

38. A multi-access remote system in accordance with claim 37 wherein said controller module receives said notification message and in response thereto notifies any one of said end users via a predetermined communication device.

39. A multi-access remote system in accordance with claim 38, wherein said predetermined communication device is an e-mail.

* * * * *